(12) United States Patent
Pfeifer

(10) Patent No.: US 9,897,203 B2
(45) Date of Patent: Feb. 20, 2018

(54) GEAR CHANGE LEVER DEVICE FOR A VEHICLE GEARING, EVALUATION DEVICE FOR A GEAR CHANGE LEVER DEVICE AND METHOD FOR ELECTRONIC ACTIVATION OF A VEHICLE DEVICE

(71) Applicant: ZF Friedrichshafen AG, Friedrichshafen (DE)

(72) Inventor: Ralf Pfeifer, Diepholz (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 14/653,643

(22) PCT Filed: Nov. 11, 2013

(86) PCT No.: PCT/EP2013/073465
§ 371 (c)(1),
(2) Date: Jun. 18, 2015

(87) PCT Pub. No.: WO2014/095156
PCT Pub. Date: Jun. 26, 2014

(65) Prior Publication Data
US 2015/0345625 A1    Dec. 3, 2015

(30) Foreign Application Priority Data

Dec. 18, 2012  (DE) .................... 10 2012 223 505

(51) Int. Cl.
*F16H 61/18* (2006.01)
*F16H 59/02* (2006.01)
*F16H 59/10* (2006.01)

(52) U.S. Cl.
CPC ......... *F16H 61/18* (2013.01); *F16H 59/0217* (2013.01); *F16H 59/105* (2013.01); *Y10T 74/2003* (2015.01)

(58) Field of Classification Search
CPC ...... F16H 59/02; F16H 59/0217; F16H 59/10; F16H 59/105
See application file for complete search history.

(56) References Cited

U.S. PATENT DOCUMENTS 7,194,927 B2 *  3/2007  Kozu .................... F16H 61/32
74/335
2013/0269463 A1 * 10/2013  Lindner ............... F16H 59/105
74/473.3

FOREIGN PATENT DOCUMENTS

DE    102008056250 A1    4/2010
EP      1541903 A1       6/2005
(Continued)

OTHER PUBLICATIONS

International Preliminary Report on Patentability dated Mar. 16, 2015 in International Application No. PCT/EP2013/073465 (German Language) (8 pages).

(Continued)

*Primary Examiner* — Justin Holmes
*Assistant Examiner* — David Morris
(74) *Attorney, Agent, or Firm* — Brinks Gilson & Lione

(57) ABSTRACT

A gear change lever device for a vehicle transmission with a holder, a gear change lever movably arranged on a holder and comprising a gripping surface, wherein the gear change lever can be moved to pre-determined positions (P, R, N, D), a sensor device, by which the current position of the gear change lever can be detected, an evaluation device coupled to the sensor device for the control of transmission, by means of which in cooperation with the sensor device a change in the gear change lever position can be recognized, and at least one touch sensor coupled to the evaluation device and arranged on the gear change lever in the area of the grip surface, by means of which a human touch of the (Continued)

Figure 1:
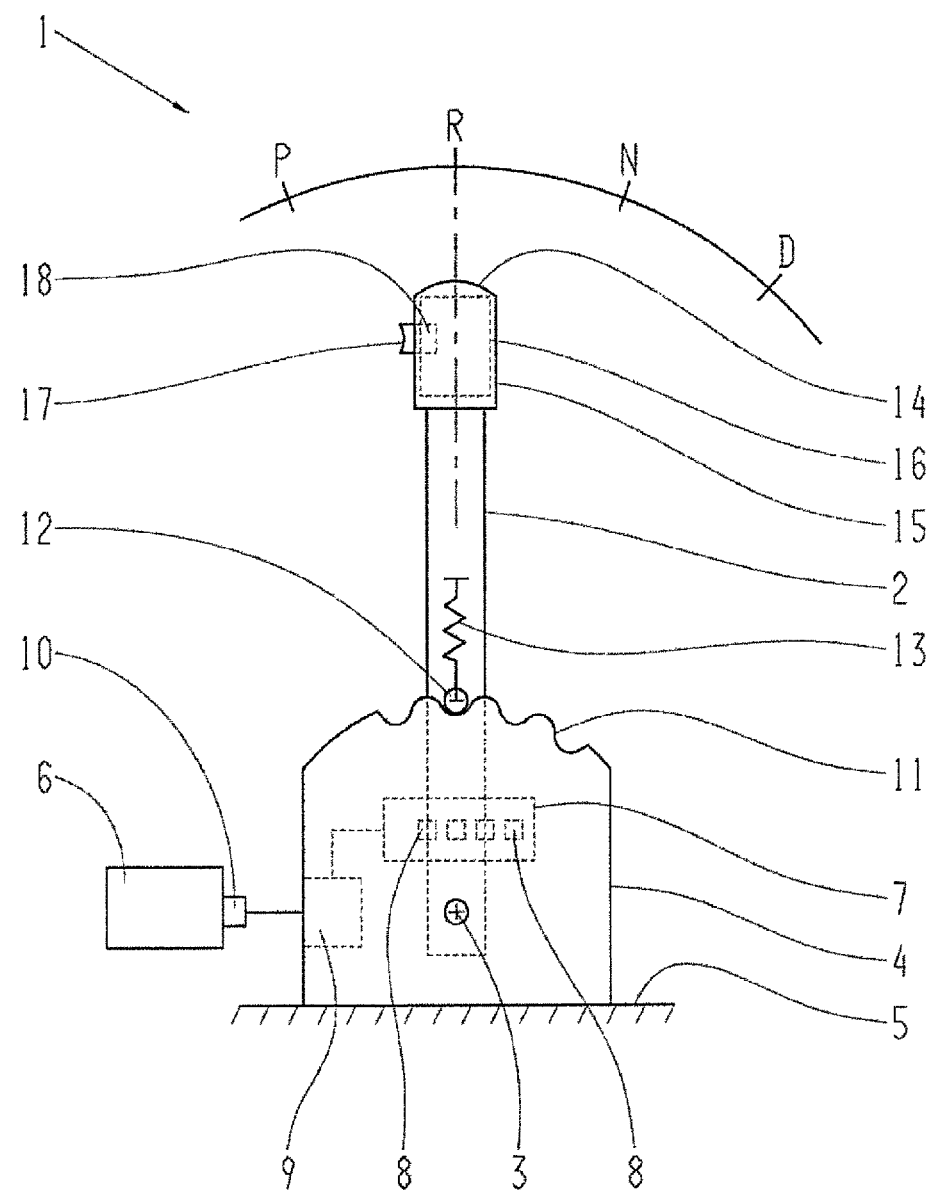

grip surface can be detected and information about the touch state of the gripping surface can be sent to evaluation device.

18 Claims, 4 Drawing Sheets

(56) References Cited

FOREIGN PATENT DOCUMENTS

| | | |
|---|---|---|
| EP | 1980441 A1 | 10/2008 |
| EP | 2017688 A2 | 1/2009 |
| WO | WO 2012/110179 A2 | 8/2012 |
| WO | WO 2013/097983 A1 | 7/2013 |

OTHER PUBLICATIONS

International Search Report dated Apr. 7, 2014 in International Application No. PCT/EP2013/073465 (5 pages).

International Search Report from corresponding International Patent Application PCT/EP2013/073465, dated Jan. 30, 2014 (German Language) (6 pages).

Office Action from corresponding DE 10 2012 223 505.1, dated Sep. 20, 2013 (5 pages)(including English translation of page 5).

* cited by examiner

GEAR CHANGE LEVER DEVICE FOR A VEHICLE GEARING, EVALUATION DEVICE FOR A GEAR CHANGE LEVER DEVICE AND METHOD FOR ELECTRONIC ACTIVATION OF A VEHICLE DEVICE

This application is a filing under 35 U.S.C. § 371 of International Patent Application PCT/EP2013/073465, filed Nov. 11, 2013, and claims the priority of DE 10 2012 223 505.1, filed Dec. 18, 2012. These applications are incorporated by reference herein in their entirety.

A gear change lever device for a vehicle transmission with a holder, wherein the gear change lever comprises a grip and is movably mounted on the holder, can be moved to a pre-determined position, a sensor device, by which the current gear change lever position can be detected, and an evaluation device for the control of the transmission, which evaluation device is coupled to the sensor device, wherein by means of the evaluation device in cooperation with the sensor device a change in the gear change lever position can be detected.

Such gear change lever devices are used in motor vehicles and have been proven in principle. However, security risks in case of an erroneous control of the transmission caused by the gear change lever device do occur. An example of such a security risk comes from a driver (start helper), who would like to give another vehicle a jump start from his (auxiliary) vehicle. While an assistant brings the motor (and thus the generator) of the auxiliary vehicle to a higher speed, the clamping of the terminal clamps of the other vehicle causes voltage fluctuations, which could cause triggering a command to the transmission to engage a gear. When the transmission follows the switching command, there is a danger to life and limb of the start assistant. Based on this, the goal the present disclosure is to reduce the risk of a faulty control of the transmission.

This goal is achieved by a gear change lever device according to claim 1. Furthermore, this goal is achieved by an evaluation device according to claim 14 and a method for a vehicle electronic control device according to claim 15. Preferred embodiments of the gear change lever device, the evaluation device and the method are indicated in the dependent claims and in the description below.

The gear change lever device for a vehicle comprises a holder, a gear lever that is movably mounted on the holder and has a grip, which gear lever can be moved into predetermined gear lever positions, a sensor device by means of which the current gear lever position can be detected, an evaluation device coupled with the sensor device for controlling the transmission, by means of which in cooperation with the sensor device a change of the gear lever position is recognizable, and at least one contact sensor coupled with the evaluation device and arranged on the gear lever in the region of the grip, by means of which in particular a human touch of the grip surface can be detected and information about the touch state of the gripping surface can be sent to the evaluation device.

By the information about the touch state, the evaluation device receives an additional opportunity to check the plausibility of the admissibility of a change in the gear lever position. If the evaluation device recognizes that a change in the gear lever position is not permitted, it will not trigger the transmission to change its gear. A change in the gear lever position is in particular inadmissible if no human contact with the grip surface has been identified. Preferably, the information about the touch state includes at least information as to whether a touched state or a non-touched state of the grip area is present. More preferably, a touched state exists only in case of a human touch. In this preferred embodiment, if no human touch is detected, a non-touch state is identified. In the example mentioned, the voltage fluctuations thus lead not only to signaling an erroneous change of in the gear lever position, but also to signaling of a faulty touch state of the gripping surface. However, the simultaneous occurrence of multiple failures is less likely than the occurrence of a single error so that the reliability is increased.

The gear change lever device is preferably installed in a vehicle. In particular, the holder is permanently connected to the vehicle body. The vehicle preferably comprises the vehicle transmission. The gear change lever device can be configured differently for right-hand drive and left-hand drive vehicles. Alternatively, it is possible to design the gear change lever device for left-hand drive vehicles and right-hand drive vehicles in the same way.

The gear lever can comprise a knob, on which the gripping surface is provided. The shift knob is in particular attributed to the gear lever. The gripping surface is preferably designed ergonomically, in particular adapted to the anatomy of the human palm. For example, the gear lever comprises a pistol grip with a finger contour, which is preferably formed by the knob. Where the term "palm" is used, it should in particular be understood as inner palm.

According to one embodiment, the transmission can assume multiple switch states. Preferably, the transmission includes a plurality of gears. These gears include, for example, one or more forward gears and one reverse gear. In particular, the switching states are associated with one or more of the gear ratios. In an automatic transmission, one of the switching states is associated with several or all forward gears, while another of the switching states is only associated with the reverse gear. Furthermore, the transmission preferably comprises an idle run. In particular, the idle run is associated with one of the switching states. In addition, the transmission has a parking position, in which in particular the vehicle brakes are applied. The parking position can, but does not have to form a switching state of the transmission. If the transmission is mechanically blocked in the parking position, the parking position in particular forms a switching state of the transmission. Each switching state is preferably associated with one gear lever positions. The parking position is preferably also associated with one of the gear lever positions. The transmission is in particular an automatic transmission. Advantageously, the transmission comprises a transmission control unit. The transmission control unit is formed in particular by a controllable actuating device by means of which a change in the switching state of the transmission can be brought about.

Preferably, the transmission, in particular the transmission control unit, can be controlled by means of the evaluation device, preferably in dependence on the touch state of the gripping surface and/or at least one other parameter. The at least one other parameter includes the current position of the gear lever and/or the current switching state of the transmission and/or vehicle speed and/or direction of travel. Advantageously, a control signal (switching command) for the transmission can be generated by means of the evaluation device, in particular in dependence on the touch state of the grip surface and/or of the at least one other parameter. Preferably, the control signal from the evaluation device can be sent to the transmission, in particular to the transmission control unit. By means of the control signal a change in the switching state of the transmission is preferably brought about. In particular, a change in the switching state of the transmission can be brought about by means of the transmission control unit in response to the control signal. Preferably, the evaluation device is coupled to the transmission, in particular to the transmission control unit. However, the evaluation device may also be formed combined with the transmission control unit.

The evaluation device comprises an electronic circuit with a digital processor and at least one memory in which an evaluation program is kept that is executable by the processor preferably for evaluating at least the information about the touch state of the grip surface sent by the touch sensor to the evaluation device or such program is kept there according to the further device aspect of the present disclosure. The memory can comprise different types of memory. For example, the memory can comprise at least one random access memory (RAM) and/or at least a read only memory (ROM). The processor is for example a microcontroller or is formed by it. The memory may preferably be a component of the processor.

In an embodiment, the evaluation device can recognize the admissibility and/or the inadmissibility of a detected change of the gear lever position, in particular by evaluating the touch state of the gripping surface and/or the at least one other parameter. The evaluation of the touch state and/or the at least one other parameter is preferably carried out by means of the evaluation program. A recognized change of the gear lever position is particularly inadmissible if no human contact with the grip surface is present. A condition for the admissibility of the detected change in the gear lever position is therefore particularly the human touch of the grip surface. In a simple case, the recognized change in the gear lever position is permitted if a human touch of the grip surface is present. Preferably, the recognized change in the gear lever position is only permitted if the human touch of the gripping surface satisfies one or more conditions.

The information about the touch state in particular comprises information about one or more characteristics of the touch (touch properties). Preferably, the one or more touch characteristics are evaluated by means of the evaluation device. It is also advantageous if the evaluation device can generate a control signal for the transmission in dependence on the evaluation of the one or more touch properties and/or at least one other parameter. Preferably, the evaluation device can compare the one or more touch characteristics with one or more predetermined reference properties that are advantageously stored in the memory of the evaluation device. Preferably, the evaluation of the one or more touch properties includes this comparison. In particular, the evaluation device can generate a control signal for the transmission in dependence on this comparison and/or of the at least one other parameter. The one or more touch properties preferably characterize the interaction between the part of the body of a man touching the grip and the touch sensor. The touching part of the body is preferably a hand, especially the palm of a hand.

One of the touch properties preferably comprises at least one electrical parameter which characterizes at least one electrical property of the human tissue with which the gripping surface is touched. Preferably, the electrical parameter is evaluated by the evaluation device. It is advantageous if the evaluation device can generate a control signal to the transmission in dependence on the evaluation of the electrical parameter and/or the at least one other parameter. Preferably, the evaluation device can compare the electrical parameter with at least one predetermined reference parameter, which represents in particular at least one of the predetermined reference characteristics. Preferably, the evaluation of the electrical parameter includes this comparison. In particular, the evaluation device can generate a control signal for the transmission in dependence on this comparison and/or at least one other parameter. The electrical parameter includes for example an ohmic resistance and/or AC impedance and/or a capacitance and/or a complex impedance. In particular, the information about the touch state includes information about the electrical parameter, preferably the ohmic resistance and/or AC impedance and/or capacitance and/or complex impedance.

The electrical parameter can characterize the electrical properties of human tissue directly or indirectly. In a direct characterization the electrical parameter corresponds for example to the electrical characteristic of the human tissue. In an indirect characterization the electrical parameter for example corresponds to at least one electrical property of the touch sensor which is influenced by the electrical property of the human tissue with which the gripping surface is touched.

By evaluating the electrical parameter, the evaluation device allows for example personal identification. Thus, unauthorized persons, such as children, are excluded from the operation of the transmission. Preferably, by evaluating the electrical parameter, the evaluation device can recognize whether the grip surface is touched with the palm of a human hand or with another object and/or another part of the human body. Thus, for example, it can be avoided that an object pushing against the gear lever and/or inadvertent touch of the gear lever leads to operation of the transmission. The reference value can, for example, be recorded by means of the touch sensor at the initial use of the gear change lever device, for example, at the beginning of a ride, and stored in particular in the memory of the evaluation device.

According to one embodiment, there is provided an evaluation device arranged on the gear lever and a switching means sensor that is coupled to the evaluation device, by means of which an actuation of the switching means can be detected. The switching means is provided in particular in the area or in the vicinity of the grip surface. Such a switching means is used, for example, to allow a change in the position of one or at least one of the gear lever positions. The reference value can be preferably detected by an actuation of the switching means for a predetermined time period or a minimum time period by means of the touch sensor. Preferably, one, several or all reference values can be detected by the touch sensor upon actuation of the switching means for the predetermined time period or a minimum time period. The predetermined period of time or minimum period of time is for example two, three, four, five or more seconds. Firstly, this can provide a sufficiently long period of time for determining a reliable reference value. Secondly, the time period is short enough not to overstretch a waiting time of the person for setting the reference value, and thus a sense of time of the person. The switching means is formed, for example, as a switch or push button, and is also referred to as a lock button. The switching means sensor may thus also be referred to as a locking button sensor.

In a further development, the grip surface is subdivided into different contact areas, wherein by means of the touch sensor, a human touch of each of the contact areas is in particular separately detected. Preferably, the information about the touch state for each of the contact areas comprises at least information about whether a touched state or a non-touched state of the respective contact area is present. Depending on the touch state of the contact areas there results in particular a touch pattern which is preferably represented by one of the touch properties. Preferably, the touch pattern can be evaluated by the evaluation device. In particular, the evaluation of the touch state includes the evaluation of the touch pattern. Advantageously, in dependence on the evaluation of the touch type and/or the at least one other parameter, the evaluation device can generate a control signal for the transmission. Preferably, the evaluation device compares the touch pattern with at least one predetermined reference pattern, which represents the predetermined reference characteristics or at least one of them. Preferably, the evaluation of the touch pattern includes this comparison. In particular, the evaluation device can generate a control signal for the transmission in dependence on this comparison and/or of at least one other parameter.

Preferably, the touch sensor can detect from each of the contact areas at least one electrical parameter which characterizes at least one electrical property of the human tissue with which the respective contact area is touched. In particular, the touch pattern comprises a distribution of electrical parameter on the grip surface. Preferably, the electrical parameters include an ohmic impedance and/or an AC impedance and/or a capacitance and/or a complex impedance. The information about the touch state in particular includes information about the electrical parameter, preferably about the ohmic impedance and/or the AC impedance and/or the capacitance and/or the complex impedance of each contact area. Furthermore, for each of the contact areas the touch sensor can detect preferably at least one force that acts on the respective contact area, in particular due to the human touch. Preferably, the touch pattern comprises a distribution of the forces on the grip surface. In particular, the information about the touch state includes information about the forces, preferably about the forces that act on each of the contact areas.

By evaluating the touch state and/or the touch pattern, it is possible to more accurately identify the type of the touch of the grip surface. It is preferred to distinguish in particular between a touch of the grip surface with the right hand and a touch of the grip surface with the left hand by evaluating the touch state and/or the touch pattern by means of the evaluation device. It is advantageous, in particular by evaluating the touch state and/or the touch pattern by means of the evaluation device to distinguish between a touch of the grip surface on a side and the touch of the grip on another side. Preferably, in particular by evaluating the touch state and/or the touch pattern by means of the evaluation device, the direction of the movement of the gear lever relative to the holder caused by the hand can be determined. Preferably, in particular by evaluating the touch state and/or the touch pattern by means of the evaluation device, it can be determined whether the grip is touched with a palm of a human hand.

It is advantageous, in particular by evaluating the touch state and/or the touch pattern by means of the evaluation device, to determine the size of a palm, with which the grip is touched. Preferably, in particular by evaluating the touch state and/or the touch pattern by means of the evaluation device, at least one force can be determined that is exerted by the palm on the grip.

The touch sensor is in particular a touch-sensitive and/or force-sensitive sensor. Preferably, the touch sensor comprises one or more sensor elements, by means of which it is possible to detect a human touch. Preferably, each of the contact areas is assigned at least one of the sensor elements. The arrangement of the contact areas is preferably defined by the arrangement of the sensor elements. Preferably, in each contact area is arranged at least one of the sensor elements. In particular, each of the sensor elements is a touch-sensitive and/or force-sensitive sensor element.

Capacitive sensors are known for example from documents DE 102006032372 A1 and DE 112006002385 T5. Such sensors may be suitable in modified form as a touch sensor. Furthermore, touch-sensitive sensors are known, for example, from the publications U.S. Pat. No. 7,800,592 B2, EP 1116166 B1 and DE 20016023 U1.

Preferably, the touch sensor and/or each of the sensor elements comprise at least two electrical conductors insulated from each other, wherein by means of the evaluation device at least one electrical characteristic between the electrical conductors can be detected. This electrical characteristic is in particular the electrical parameter. This electrical characteristic advantageously depends on the touch. This electrical characteristic preferably includes the ohmic impedance and/or the AC impedance and/or the capacitance and/or the complex impedance. The evaluation device preferably comprises an AC voltage source, by means of which an AC electric voltage is generated and can be applied in particular to the electrical conductor. The frequency of the AC voltage can be constant or variable. Furthermore, the AC power source can be formed by the processor. The electrical conductors are preferably arranged in or below the grip surface. In particular, the electrical conductors can be integrated in the matrix of a composite material so that the strength of the gear lever can be increased. In case of multiple sensor elements, at least one of the conductors of each sensor element is preferably uniquely linked to the respective sensor element. Another one of the conductors of each sensor element can be a common conductor for several or each of the sensor elements. Alternatively, the conductors of each sensor element are uniquely assigned to the respective sensor element.

The evaluation device can, particularly by the detection and/or evaluation of a change in the electrical characteristic between the conductors, distinguish between a touch state of the grip surface and a non-touched state of the grip surface.

Preferably, the electrical characteristic between the conductors changes, when the touch state changes from a touched state to a non-touched state and/or when the touch state changes from a non-touched state to a touched state. This is because the human tissue and/or the palm of the hand have electrical characteristics which change the ohmic impedance and/or capacitance and/or the AC current impedance and/or the complex impedance between the electric conductors. The electrical properties of human tissue and/or the palm of the hand are dependent in particular on the body components such as fat, protein and water. Advantageously, by means of the evaluation device it is possible to determine these different components. Thus, for example, a personal identification is possible.

In a further development, the sensor device comprises a plurality of position sensors, by means of which the current position of the gear lever can be detected. Thus, it is possible to control the transmission according to the current gear lever position, which is done in particular by means of the evaluation device. Advantageously, the sensor device also allows detection of intermediate positions of the gear lever. Preferably, the transmission can be controlled by the evaluation device to carry out a change of the switching state.

The gear change lever device in particular has the following advantages: Upon actuation of the gear lever, the evaluation by the evaluation device cannot be bypassed. Thus, greater security and more reliable operation of the gear change lever device can be achieved. Risks of incorrect operations can be reduced because the gear change lever device receives by the touch sensor an additional possibility for checking the plausibility whether an operator has changed the gear lever position intentionally or unintentionally. The circuit complexity of the evaluation device can be kept relatively low when the evaluation is carried out by the evaluation program executed in the processor.

Furthermore, the transmission can be better controlled, especially when using the evaluation device for determining the direction of the movement of the gear lever. Also, the evaluation device can be connected with other driver assistance systems and report them the touch state. This allows, for example, support of superordinate security strategies at the vehicle level.

Several examples of the use and design of the gear change lever device are explained below:

First example: on the gear lever is constructively defined the grip provided for operation, wherein under its surface are arranged the at least two conductors electrically insulated from each other, for example, in wire form, which conductors take over the function of a capacitor. The capacitance and/or the AC current impedance of the capacitor are continuously monitored by means of the evaluation device. When starting the vehicle (ignition on), in which the gear change lever device is installed, the driver must press the lock button to exit the parking position. At this moment, the driver's hand touches the grip surface and influences the capacity and/or the AC impedance of the capacitor. The capacitance and/or the AC impedance are detected by the evaluation device in the moment of contact and is stored as a reference characteristic (calibration value) for the sensitivity of the touch sensor. This can ensure that drivers wearing gloves or drivers with different hand sizes are not excluded from the authorized operation of the gear lever (differences in hand size and in the span of the hand exist, for example, among drivers of different sexes). If the gear lever is now moved by an object or a child's hand, the evaluation device recognizes this movement as an unauthorized gear lever operation and stops the relevant actuation of the transmission. The same applies for a fleeting touch that may occur, for example, due to accidental bumping into the gear lever. In all these cases, the detected capacitance and/or AC impedance differ so greatly from the calibration value that an unauthorized operation can be ruled out by the evaluation device.

Recalibration without restarting the vehicle is for example possible in that the lock button is operated at least two, three, four, five or more seconds. Particularly preferred period of time is five seconds. Firstly, this can provide a sufficiently long period of time for recalibrating. Secondly, the time period is short enough not to overstretch the person's waiting time for recalibrating and thus a sense of time of the person. Further, it is possible to measure the capacitance and/or the AC impedance at different frequencies, so that the different components of the hand can be more accurately determined and used for better identification of the driver. It is also possible to control the reaction speed of the transmission by means of the evaluation device. If the driver clasps the gear lever particularly strongly or tensely, which results in a high capacitance of the capacitor over a longer period, the evaluation device for example assumes that the driver desires a rapid operation of the transmission. The reaction speed of the transmission can now be increased. If in contrast the driver touches the gear lever in a relaxed manner, for example, with only two fingers, the evaluation device for example assumes that the driver wants a relaxed driving. In this case, the reaction speed of the transmission can be reduced. The control of the reaction speed of the transmission can for example take place in a shifting path of the gear change lever device.

Second example: If the gear change lever device has a hold-to-run control device to manually change the switching state of the transmission, there are opportunities to optimize the gear changing process. The transmission is, for example, a direct-shift transmission or an automatic transmission.

In these transmission types, in the powerless branch the gear can already be preselected before the driver switches manually. Here, the transmission control unit must make a prediction as to whether the driver wants to upshift or downshift. If the predicting fails, the switching time increases, because initially the gear must be changed in power-free branch. If the evaluation device can detect not only the contact of the grip surface with the hand, but also the direction in which the driver pushes or will push the gear lever, a possibility for transmission feedforward is created, for example, to prepare an overtaking maneuver. In the power-free branch of the transmission the next lower gear can now be selected at medium engine speed.

On the shift lever is constructively defined the actuating grip, wherein under its surface are arranged the at least two conductors insulated from each other, for example, in wire form, which assume the function of a capacitor. The capacitance and/or the AC current impedance of the capacitor are continuously monitored by means of the evaluation device. The arrangement of the conductors is selected such that an identification of the operation direction of the gear lever is possible. Thus, the transmission can be communicated the driver's request, and the transmission can prepare an upshift or a downshift. This feedforward control can also be implemented with shift paddles provided at the steering wheel. Alternatively, shift paddles with two switching stages can be used.

Third example: This example deals with superordinate security strategies that can be supported by the gear change lever device. In particular, information on the touch state can be communicated to other systems.

a) A first security strategy concerns the feedforward of an antilock braking system as a function of the touch state (yawing moment). When the driver touches the grip surface with one hand, braking in a panic under μ-split conditions (traces of snow, leaves or gravel at the roadside with a dry road center) he may not be able to compensate for the braking torque build-up in the steering wheel caused by the braking, if no active steering is installed. Since the evaluation device recognizes that the driver's hand touches the grip area and that therefore the driver is not holding the steering wheel with both hands, it is possible to switch off the yaw moment attenuation of the antilock braking system slower, so that the driver is not overwhelmed.

b) A second security strategy relates to an inadvertent gear lever operation, for example by an object or by playing children. If the gear lever is moved by a fleeting touch, by an object or by a child's hand, this is recognized by the evaluation device as unauthorized operation of the gear lever. In the vehicle can be provided a display coupled to the evaluation device by which in this case a warning signal can be sent without the transmission being actuated according to the unauthorized activity.

c) A third security strategy relates to a weakness or failure of the driver. The evaluation device can recognize an implausible gear selection and/or an implausible gripping direction. An implausible gear selection exists, for example, when at a relatively high speed the gear lever is set to the parking position. An implausible gripping direction occurs, for example, when in a right-hand drive vehicle, the gear lever is grasped with the right hand. From such cases of implausibility, conclusions about an issue (e.g. weakness, failure) of the driver can be drawn. Furthermore, such cases of implausibility can be linked to information from other systems. For example, one of these other systems could realize that in spite of full throttle, the hand brake is actuated. In addition, a lane departure warning system, which is for example one of these other systems, could recognize driver's inattentiveness.

By evaluating one or more such cases of implausibility, possibly together with the information from one or more of the other systems, further action can be taken by a superior system. By evaluating the situation, it is detected, for example, by means of the superior system that the driver has suffered a heart attack and the passenger is trying to bring the vehicle under control. Based on this evaluation of the situation, for example, measures for faster and safe stopping of the vehicle can be initiated by the superior system.

d) A fourth security strategy relates to the use of the vehicle by an unauthorized user. For this purpose, the capacity profile of the authorized driver is saved and linked, for example, to the ignition key. If the capacity profile of the current user differs from the capacity profile of the authorized driver in an unacceptable manner, the use of the vehicle by an unauthorized user is detected so that the operability of the vehicle can be restricted. For example, the maximum speed of the vehicle is limited (e.g. to 100 km/h). Furthermore, the acceleration of the vehicle may be limited (e.g. to 2 m/s$^2$). In addition or complementary, vehicle tracking can be turned on and/or an anti-theft alarm siren can be activated.

The procedural aspect of the present disclosure is solved by a method of electronic control of a vehicle device, in particular a vehicle transmission, by means of an evaluation device, said evaluation device being electronically coupled with a touch sensor of an operating device, wherein the touch sensor is provided in a section of an operating surface of the operating device and is adapted to detect a particular human touch of the operation surface and to send information about the touch state of the operation surface to the evaluation device. The evaluation device can be preferably an evaluation device for a previously described gear change lever device for a vehicle transmission, wherein the operating device to the gear change lever device and the actuating surface to the described grip surface correspond. Preferably, the evaluation device can have a similar or identical configuration and operation as described in connection with the gear lever device evaluation device, wherein the described functions can represent preferred other individual and/or related process steps for the claimed method of electronic control of a vehicle device.

The method according to the present disclosure comprises a step of determining and saving a reference value for the sensitivity of the touch sensor on the basis of information on the touch state when the operating surface is touched, and a subsequent step of determining a sensitivity value based on the information about the touch state with another touching of the operating surface. The evaluation device thus sets the reference value or the sensitivity value on the basis of information supplied by the touch sensor. It can preferably be a value concretely measured by the touch sensor which is defined by the evaluation device as a reference value or sensitivity value. Alternatively, the evaluation device can determine and set the reference value or the sensitivity value from the information received from the touch sensor. This can be preferably done for example by a measuring device associated with the evaluation device for measuring complex impedance. The reference value may preferably be cached at least for a certain period or may be saved permanently. A caching can be done, for example, for a period of the use of the gear change lever device, wherein the period of use can be determined, for example by switching on the ignition, more preferably by an engine start and a turning off the ignition, further preferably by switching off the engine. The sensitivity value or the sensitivity values specified in the course of the use can preferably also be saved permanently. The values can be preferably saved so that they can be retrieved and evaluated in the course of an analysis such as a function analysis.

The reference value and the sensitivity value can be based, for example, on an electrical parameter, wherein the electrical parameter can preferably be an electrical parameter as described above, which can be detected by a measuring device associated with the touch sensor, or as an alternative with the evaluation device, and further processed by the evaluation device.

The method further comprises a step of determining the next step of evaluating a comparison between the reference value and the measured sensitivity value for determining the necessity for the transfer of an electronic control signal. The steps do not necessarily follow directly one another. There can preferably follow further or other process steps between the individual process steps. To solve the underlying problem, it depends on the sequence of the process steps in order to carry out the comparison of the set values and the evaluation based thereupon.

According to one embodiment of the claimed method, the steps of setting a sensitivity value and evaluating the comparison can be cyclically repeated any number of times. For example, at the beginning of the use of the motor vehicle by a first-time touch of the operating area, the reference value can be recorded or defined and saved in a manner described above. During the use of the motor vehicle, the sensitivity value can be recorded or determined by further contacts with the actuating surface and the evaluation device can perform a comparative analysis and decide whether a control signal should be sent and, if so, which information will be transmitted with the control signal. In other words, the comparative analysis may lead to action by the evaluation device. The measure may be, for example, a plausibility check described above regarding a permissible gear selection and/or a permissible gripping direction and/or a person identification as described above. In general, a measure to be taken by the evaluation device can be either "do" or "do not". The "do not" measure can be defined as not sending a control signal, while the "do" measure can be defined as sending a control signal with executable information to a control device that is coupled to the vehicle device and controls it. As described above, the vehicle device can preferably be a vehicle transmission and consequently the control device can be a transmission control unit. This allows performance of an upshift or downshift in the transmission on the basis of the control signal. Alternatively or additionally, the control signal preferably includes executable information, for example, for the transmission control unit for controlling the reaction speed of the transmission as previously described. Further preferred possible action by the evaluation device results in an exemplary manner from the above-described operations of the evaluation device.

According to another preferred embodiment of the present disclosure, the method preferably includes a step of recalibration of the reference value if necessary, wherein the recalibration is carried out prior to the step of setting a sensitivity value. More preferably, the step of recalibration after setting a reference value can be replaced by the step of setting the reference value. Alternatively or additionally, the step of setting and the step of recalibration can preferably be identical. For this case, the reference value to be re-calibrated is first assumed to be zero in order to replace this value after the step of recalibration by the recalibrated reference value. This could be necessary, for example, in a first use of the vehicle device or in case of resetting or deletion of information saved in the evaluation device. The need for recalibration may be displayed to a driver by coupling the evaluation device with a display-capable vehicle device. The display-capable vehicle device may in this case be a vehicle display device commonly arranged in the field of vision of the driver comprising a display panel for displaying the necessity of performing recalibration. The recalibration can be done for example by a restart of the motor vehicle, for example, a switch-on of the ignition or starting the engine or by pressing a button such as the lock key as described above. Recalibration may preferably be required if a comparison value between the reference value and the set sensitivity values in the course of successive evaluations changes so that the comparison value in the course of evaluations falls outside a pre-determined tolerance. The pre-determined tolerance may preferably be information saved in the evaluation device or externally, in other words, stored outside of the evaluation device, which is taken into account in the evaluation of the comparison value.

Figure 2:
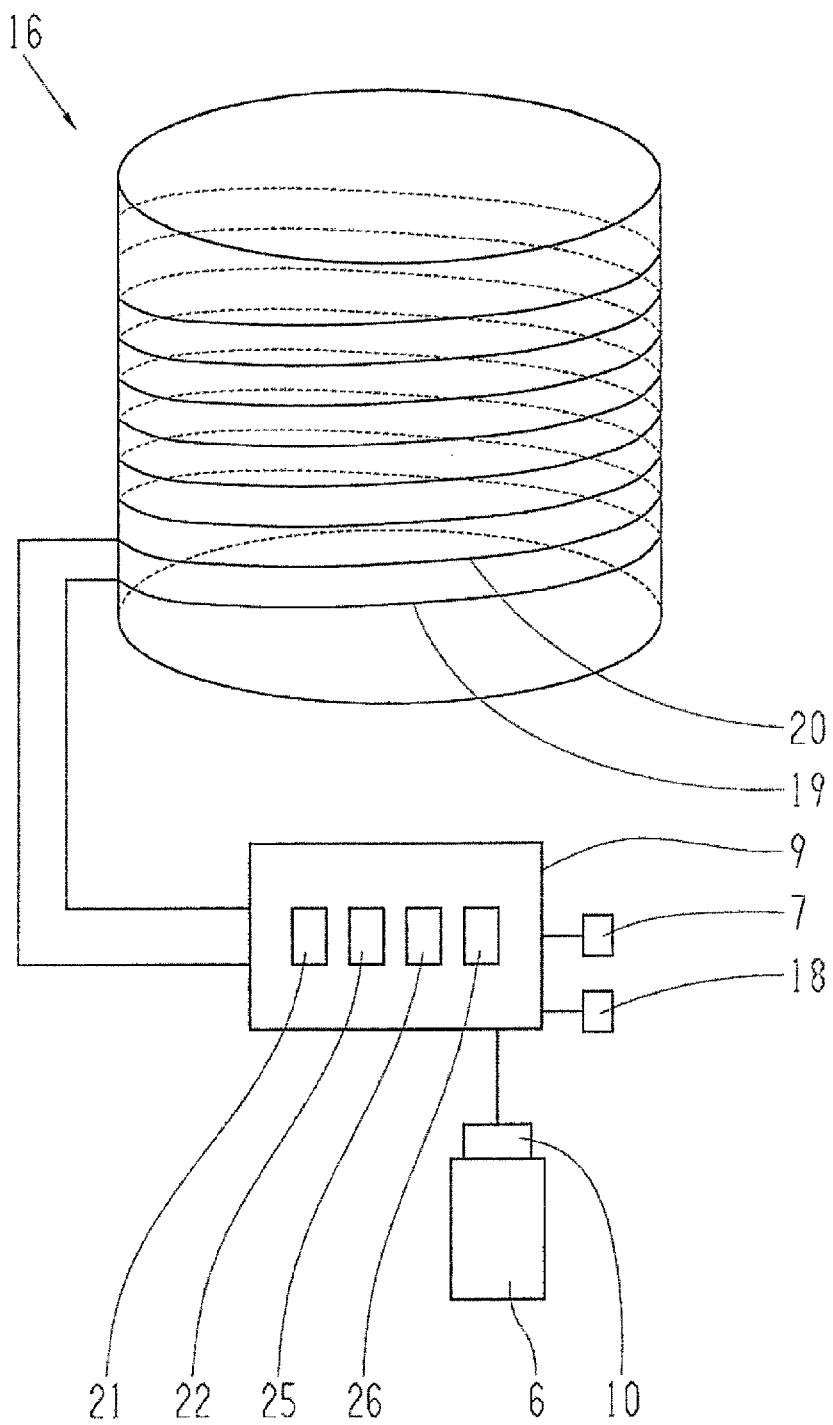
Figure 3:
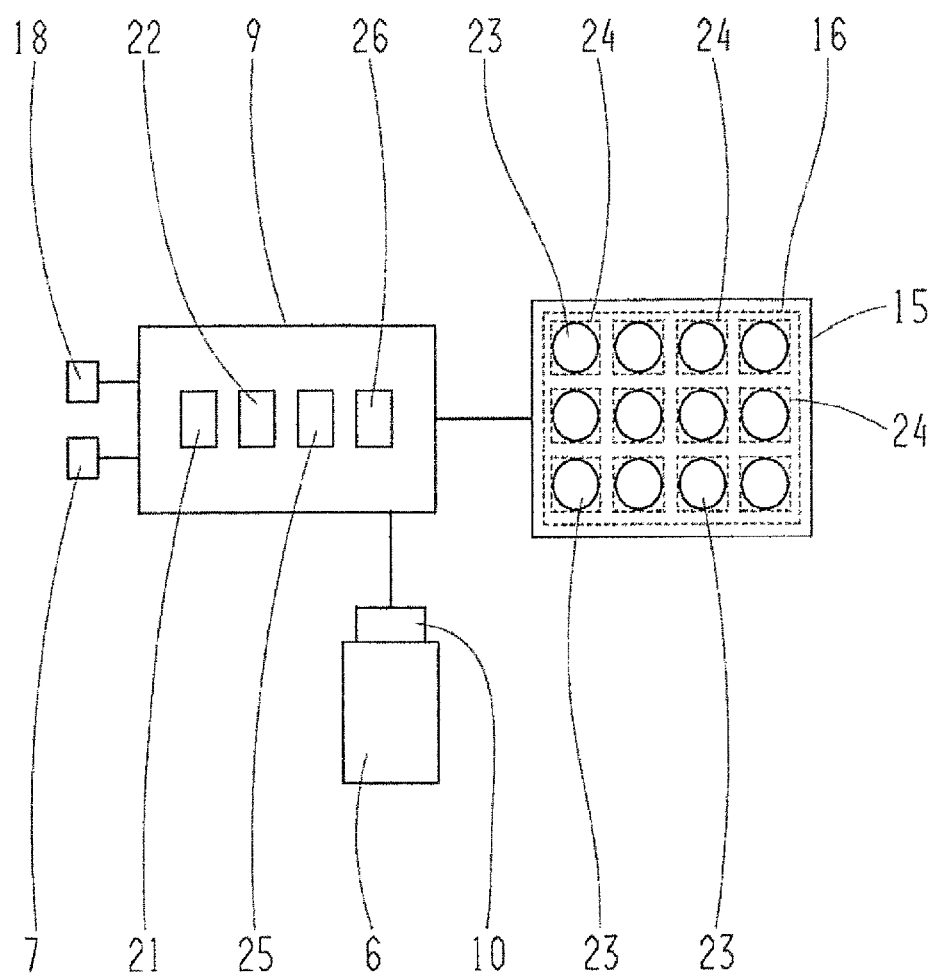
Figure 4:
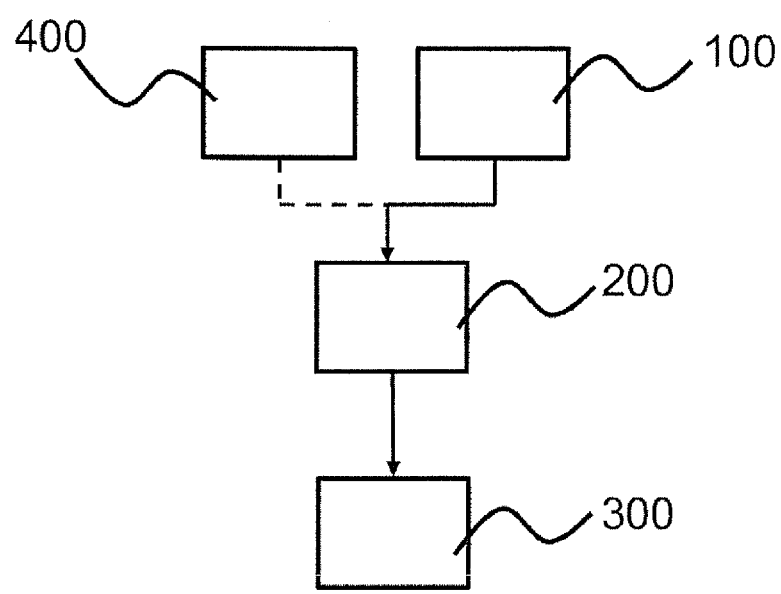

The present disclosure is described below by means of preferred embodiments with reference to the drawings. In the drawings:

FIG. 1 shows a schematic view of a gear change lever device according to a first embodiment, FIG. 2 shows is a schematic representation of the touch sensor and the evaluation device shown in FIG. 1, FIG. 3 shows a schematic representation of an evaluation device and a touch sensor according to a second embodiment, and FIG. 4 shows a schematic representation of a method according to an exemplary embodiment.

In FIG. 1 is shown a gear change lever device 1 according to a first embodiment, wherein a gear lever 2 is pivotally mounted on a holder 4 about a switching axis 3, which is fixedly mounted in a vehicle 5, which comprises a vehicle transmission 6. The gear lever 2 can be pivoted about the shifting axis 3 in different control lever positions P, R, N and D. On the holder 4, a sensor device 7 is provided with a plurality of position sensors 8, by means of which the current position of the gear lever 2 can be detected. The sensor device 7 is electrically connected to an evaluation device 9, which in turn is electrically connected to a transmission control unit 10 of the transmission 6. Furthermore, a locking device is provided which comprises a locking rail 11 provided on the holder 4 and a detent element 12 provided on the gear lever 2, which is clamped against the locking rail 11 by a detent element spring 13. At a free end of the gear lever 2 is attached a shift knob 14, which according to the first embodiment is substantially cylindrical and is attributed to the gear lever 2. The surface of the shift knob 14 comprises a gripping surface 15, below which a touch sensor is embedded in the material 16 of the shift knob 14. Furthermore, a lock button 17 is provided on the shift knob 14, whose operation can be detected by means of a locking key sensor 18. The touch sensor 16 and the locking key sensor 18 are electrically connected to the evaluation device 9.

The transmission 6 is an automatic transmission, so that the gear lever position P is assigned to a parking position, in which in particular the brake of the vehicle 5 or at least one of the vehicle's brakes is actuated. The gear lever position R is assigned to a reverse gear of the transmission 6, and the gear lever position N is assigned to an idling of the transmission 6. The gear lever position D is for a normal forward driving operation of the vehicle, so that a number of forward gears of the transmission 6 are assigned to the gear lever position D. At least the gear lever partitions R, N and D are thus associated with a respective switching state of the transmission 6.

FIG. 2 shows a schematic view of the touch sensor 16 which comprises two electrical conductors 19 and 20 wound as a double helix that are electrically insulated from each other and in particular are formed by a wire. The evaluation device 9 comprises an AC voltage source 21 by means of which an alternating current voltage is applied to the electrical conductors 19 and 20, and a measuring device 22 by means of which the complex resistance between the electrical conductors 19 and 20 is measured. Further, the evaluation device 9 comprises a digital processor 25 and a memory 26 in which an evaluation program is installed which is executable by the processor 25 for evaluating the information about the touch state of the gripping surface 15 sent from the touch sensor 16 to the evaluation device 9. The processor 25 can also be formed by a microcontroller. In this case, the microcontroller can comprise the alternating current voltage source 21 and/or the measuring device 22.

If the grip area 15 is touched by the palm of a driver of the vehicle 5, the complex resistance measured by the measuring device 22 changes. It is in particular the capacitive component of the resistance that changes. The change in the complex resistance and/or the capacitive component due to the touch is particularly dependent on the water content in the human body (the water content is for example 60%) and/or on the difference in the electric permittivity in the touched state and in the non-touch state (the ratio of the permittivity of water to the air is for example about 77) and/or on the change in the electrical permittivity as a function of the frequency of the applied voltage (dispersion). The evaluation device 9 can thus detect a human touch of the gripping surface 15.

If for example the gear lever 2 is unintentionally transferred by an object from the gear lever position N to the gear lever position D, so by evaluating the detected complex resistance, the evaluation device 9 can identify that this gear lever position change took place without the palm of the driver having touched the gripping surface 15. The gear lever position change is thus evaluated as inadmissible and the process to change the switching state of the transmission is not started.

FIG. 3 shows a schematic representation of an evaluation device 9 and a grip surface 15 in a second embodiment, in which identical or similar features are denoted by the same reference numerals as in the first embodiment. The grip surface 15 is divided into several contact areas 23, each having assigned a touch-sensitive sensor element 24, by means of which a human touch of the respective contact area can be detected. The sensor elements 24 are electrically connected to the evaluation device, and together constitute the touch sensor 16, by means of which a planar touch pattern on the gripping surface 15 can be detected. By means of the evaluation device 9, the planar touch pattern is evaluated and then compared with one or more predefined reference patterns. This evaluation for example allows recognition of whether the gripping surface 15 was touched with the right or the left hand.

For a further description of the second embodiment reference is made to the description of the first embodiment.

In particular, the touch sensor according to the first embodiment can be replaced by the touch sensor according to the second embodiment.

FIG. 4 shows a schematic representation of a method for electronic control of a vehicle device according to a preferred embodiment of the present disclosure. The method is suitable for example for a gear lever device according to one of the embodiments described above, wherein the vehicle transmission 6 is controlled by the evaluation device 9.

In a first step 100, a reference value for the sensitivity of the touch sensor 16 is first set and saved. The setting is based on the information about the touch state upon a touch of the grip surface 15, wherein the information may contain a concrete value measured by the measuring device 22, which is then set by the evaluation device 9 as a reference value.

In a subsequent step 200, a sensitivity value of the evaluation device 9 is set.

The setting can be carried out in the same manner as for the reference value, wherein the evaluation device 9 for example sets the sensitivity value as a concrete value measured by the measuring device 22 at a subsequent touching of the grip surface 15. Subsequently, in a further step 300 a comparison between the reference value and the sensitivity value is evaluated. Based on the evaluation, the evaluation device 9 can send a signal to the transmission control unit 10. This can be the case, for example, if the analysis shows that it is an allowable operation of the gear change lever device 1, by means of which a gear shift is to be made. The signal then contains the information necessary for the gear shifting process. If the operation of the gear change lever device 1 is evaluated as inadmissible, the evaluation device 9 sends no signal to the transmission control unit 10, thereby causing that a gear shift operation by the vehicle transmission 6 is omitted. Alternatively, even if the operation of the gear change lever device 1 is evaluated as inadmissible, the evaluation device 9 can send a signal to the transmission control unit 10, wherein the signal contains such information that classifies a gear shift by the vehicle transmission 6 as inadmissible and thus it will not be carried out. Such a control signal can be sent for example in case of a redundant control of the transmission control unit 10 for verification purposes.

The method further comprises a process step 400, by means of which a recalibration of the reference value can be carried out, if necessary. The need for recalibration can be displayed to a driver before step 400 by coupling the evaluation device 9 with a display-capable vehicle device 5. The display-capable vehicle device may in this case be a vehicle display device commonly arranged in the field of vision of the driver and comprising a display panel for displaying the necessity to perform recalibration. The recalibration is carried out before the process step 200. The recalibration can, for example, replace the process step 100. Alternatively, the recalibration can be identical to the step 100. In this case, at a first operation of the gear change lever device 1 in which a setting of a reference value for the subsequent evaluations and comparisons is necessary the process step 100 is omitted, wherein the evaluation device 9 sets the reference value to a zero value and this value is saved in the evaluation device or is saved externally. After performing the process step 400, this zero value is replaced by the recalibrated reference value. This could be necessary, for example, in a first use of the gear change lever device 1 or in case of resetting or deletion of information stored in the evaluation device 9 or in an external memory. The recalibration can be done for example by a restart of the motor vehicle, for example, by switching on the ignition or starting the engine or by pressing a button such as the lock button 17 for a predetermined period of time, for example, for 5 seconds. Recalibration may be required if a comparison value between the reference value and the set sensitivity values in successively performed evaluations changes such that the comparative value in the course of evaluations falls outside a pre-determined tolerance. The pre-determined tolerance can be information saved in the evaluation device 9 or externally, in other words, outside of the evaluation device, which is taken into account in the evaluation of the comparison value. In this case, the evaluation device 9 sends a signal to the display device in order to be able to display appropriate visual signal to the driver on the display panel.

REFERENCE NUMERALS

1 Gear change lever device
2 Gear change lever
3 Gear change axis
4 Holder
5 Vehicle
6 Vehicle transmission
7 Sensor device
8 Position sensor
9 Evaluation device
10 Transmission control unit
11 Locking rail
12 Detent element
13 Spring
14 Shift knob
15 Grip surface
16 Touch sensor
17 Lock button
18 Lock button sensor
19 Electrical conductor
20 Electrical conductor
21 Alternating current voltage source
22 Measuring device
23 Contact area
24 Sensor element
25 Processor
26 Memory
100 First process step
200 Second process step
300 Third process step
400 Further process step

The invention claimed is:

1. A gear lever device for a vehicle transmission, the gear lever device comprising:
   a holder,
   a gear lever movably mounted on the holder, the gear lever comprising a gripping surface, wherein the gear lever is moveable to predetermined gearshift positions;
   a sensor device for determining a current gear lever position;
   an evaluation device for controlling the transmission, the evaluation device coupled to the sensor device wherein the sensor device and evaluation device are configured to detect changes in the gear lever position; and
   a touch sensor electronically coupled to the evaluation device and arranged on the gear lever in the region of the gripping surface, wherein the touch sensor is configured to detect a human touch on the gripping surface and send information about a touch state of the gripping surface to the evaluation device, wherein the touch sensor is configured to monitor at least two contact areas on the gripping surface and is configured to detect at least two different forces from the human touch on the at least two contact areas at the same time, wherein the evaluation device is configured to set and store a reference value for a sensitivity of the touch sensor on the basis of the information regarding the touch state when the gripping surface is touched, wherein the evaluation device is configured to set the reference value to a zero value prior to setting and storing the reference value, wherein the evaluation device is configured to subsequently set a sensitivity value on the basis of the information regarding the touch state with a further touching of the gripping surface, and wherein the evaluation device is configured to evaluate a comparison of the reference value and the sensitivity value in order to determine a necessity for sending an electronic control signal.

2. Gear change lever device according to claim 1, wherein the evaluation device determines the inadmissibility of a detected change in the gear lever position by evaluating the touch state.

3. Gear change lever device according to claim 1, wherein the evaluation device can distinguish a touching of the gripping surface with a right hand from a touching of the gripping surface with a left hand by evaluating the touch state.

4. Gear change lever device according to claim 1, wherein the evaluation device can distinguish the direction of a movement of the gear lever relative to the holder caused by a hand by evaluating the touch state.

5. Gear change lever device according to claim 1, wherein the evaluation device can distinguish the human touching of the gripping surface on a first gripping surface side from the human touching of the gripping surface at a second gripping surface side on the basis of the information regarding the touch state, wherein the first gripping surface side is different from the second gripping surface side.

6. Gear change lever device according to claim 1, wherein a touch pattern resulting from the touch state of the contact area can be evaluated by the evaluation device, wherein the touch pattern comprises a distribution of an electrical parameter on the gripping surface.

7. Gear change lever device according to claim 6, wherein the touch pattern can be compared with at least one predetermined reference pattern by the evaluation device.

8. Gear change lever device according to claim 1, wherein the touch sensor comprises a plurality of sensor elements each operable to detect the human touch, wherein each of the contact areas is assigned at least one of the sensor elements.

9. Gear change lever device, according to claim 8, wherein each of the sensor elements comprises at least two electrical conductors, wherein the least two electrical conductors are electrically isolated from each other, wherein a change of at least one electrical property between the conductors of the respective sensor element can be detected by the evaluation device.

10. Gear change lever device according to claim 9, wherein the electrical property comprises an ohmic resistance, an alternating current impedance or a capacitance between the conductors.

11. Gear change lever device according to claim 9, wherein the electrical conductors are arranged on or below the gripping surface.

12. Gear change lever device according to any one of claim 1, wherein the touch sensor comprises at least two electrical conductors, wherein the at least two electrical conductors are electrically isolated from each other, wherein a change in at least one electrical property between the conductors can be detected by the evaluation device.

13. Gear change lever device according to claim 12, wherein the electrical property comprises an ohmic resistance, an alternating current impedance or a capacitance between the conductors.

14. Gear change lever device according to claim 12, wherein the electrical conductors are arranged on or below the gripping surface.

15. Gear change lever device according to claim 1, wherein the evaluation device can be electronically coupled to the touch sensor and wherein the evaluation device comprises an electronic circuit having a processor and a memory with an evaluation program executable by the processor for evaluating at least the information about the touch state of the gripping surface sent from the touch sensor to the evaluation device.

16. Gear change lever device according to claim 1, wherein the evaluation device will only command the transmission to change a gear position when the touch state is indicative of a human touch.

17. Gear change lever device according to claim 1, wherein the evaluation device is operable to send information about the touch state to a superior vehicle control system, and wherein the superior vehicle control system uses the information about the touch state to control the vehicle.

18. A method for electronic control of a vehicle device with an evaluation device, wherein the evaluation device is electronically connected to a touch sensor of an operating device, wherein the touch sensor is arranged in an area of an actuating surface of the operating device and is capable to detect at least two different forces from a human touch on at least two contact areas of the actuating surface at the same time and send the information about a touch state of the actuating surface to the evaluation device, the method comprising:

setting a reference value for the sensitivity of the touch sensor to a zero value, setting and storing the reference value for the sensitivity of the touch sensor on the basis of information about the touch state at a touch of the operating surface, setting a sensitivity value based on the information about the touch state at a further touch of the actuating surface, and comparing the reference value and the sensitivity value to determine a necessity to send an electronic control signal.

* * * * *